(12) United States Patent
Takami et al.

(10) Patent No.: US 11,114,685 B2
(45) Date of Patent: Sep. 7, 2021

(54) BONDING DIES FOR FUEL CELL

(71) Applicant: TOYOTA JIDOSHA KABUSHIKI KAISHA, Toyota (JP)

(72) Inventors: Rie Takami, Nishikamo-gun (JP); Makoto Adachi, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 16/447,436

(22) Filed: Jun. 20, 2019

(65) Prior Publication Data

US 2019/0393530 A1 Dec. 26, 2019

(30) Foreign Application Priority Data

Jun. 21, 2018 (JP) .............................. JP2018-117682

(51) Int. Cl.
| | |
|---|---|
| *H01M 8/1004* | (2016.01) |
| *H01M 8/00* | (2016.01) |
| *H01M 8/0273* | (2016.01) |
| *H01M 8/0286* | (2016.01) |
| *H01M 8/2404* | (2016.01) |

(52) U.S. Cl.
CPC ......... *H01M 8/1004* (2013.01); *H01M 8/006* (2013.01); *H01M 8/0273* (2013.01); *H01M 8/0286* (2013.01); *H01M 8/2404* (2016.02)

(58) Field of Classification Search
None
See application file for complete search history.

(56) References Cited

U.S. PATENT DOCUMENTS

| | | | | |
|---|---|---|---|---|
| 6,517,338 B1* | 2/2003 | Koga | ...................... | B29C 43/36 425/412 |
| 7,005,208 B2* | 2/2006 | Suenaga | ............. | H01M 8/0273 429/535 |
| 2002/0132152 A1* | 9/2002 | Saito | ................... | H01M 8/0228 429/492 |
| 2014/0305596 A1* | 10/2014 | Ahn | ..................... | H01M 8/0273 156/583.1 |
| 2015/0004522 A1* | 1/2015 | Lipilin | .................. | H01M 8/122 429/480 |

FOREIGN PATENT DOCUMENTS

| | | |
|---|---|---|
| JP | 2017-126457 A | 7/2017 |
| JP | 2017-168230 A | 9/2017 |

* cited by examiner

*Primary Examiner* — Mark A Osele
*Assistant Examiner* — Evan T Hulting
(74) *Attorney, Agent, or Firm* — Sughrue Mion, PLLC (57) ABSTRACT

Bonding dies for producing a fuel cell that can suppress floating of a portion of a resin frame bonded to a membrane electrode assembly include first and second dies facing and contacting respective first and second separators. The first die includes a central receiving portion and an outer periphery receiving portion. The second die includes an inner die that pressurizes a central region of the second separator, and an outer die formed to surround the inner die to thermally compress a peripheral region of the second separator. The inner die extends from a portion corresponding to the central region along an open edge in the resin frame, up to a region closer to an outer periphery side of the electrode assembly than a portion of the resin frame bonded to the membrane electrode assembly, so as to pressurize the resin frame via the other separator.

3 Claims, 9 Drawing Sheets

BONDING DIES FOR FUEL CELL

CROSS REFERENCE TO RELATED APPLICATIONS

The present application claims priority from Japanese patent application JP 2018-117682 filed on Jun. 21, 2018, the content of which is hereby incorporated by reference into this application.

BACKGROUND

Technical Field

The present disclosure relates to bonding dies for producing a fuel cell. In particular, the present disclosure relates to bonding dies for bonding a pair of separators to opposite faces of a membrane electrode assembly to form a fuel cell.

Background Art

Conventionally, some fuel cells have been produced by arranging a pair of separators on opposite faces of an electrode assembly, which includes a membrane electrode assembly and a resin frame disposed around it using an adhesive, and joining the resin frame and the separators together through thermal compression bonding (for example, see JP 2017-126457 A).

Such bonding is typically performed using bonding dies that include first and second dies, for example. During the bonding, the electrode assembly having the separators arranged on its opposite faces is disposed between the first and second dies, and is then thermally compressed by the first and second dies so that the resin frame is welded to the separators.

SUMMARY

However, when the separators are bonded to the electrode assembly by the first and second dies, a moment acts on the resin frame relative to the membrane electrode assembly, so that the portion of the resin frame bonded to the membrane electrode assembly may float off the membrane electrode assembly along an open edge formed in the resin frame. Due to such floating, a gap may be formed between the membrane electrode assembly and the resin frame, with the result that fuel gas or oxidant gas flowing through the membrane electrode assembly may leak out through the gap.

The present disclosure has been made in view of the foregoing, and provides bonding dies for producing a fuel cell that can, when bonding a pair of separators to opposite faces of an electrode assembly, which includes a membrane electrode assembly and a resin frame securely bonded thereto, suppressing floating of the portion of the resin frame bonded to the membrane electrode assembly.

Accordingly, the bonding dies for producing a fuel cell in accordance with the present disclosure are bonding dies for producing a fuel cell, the fuel cell including an electrode assembly that includes a membrane electrode assembly having gas diffusion layers stacked on opposite faces of the membrane electrode assembly, and a resin frame fixed on the membrane electrode assembly via a bonded portion so as to surround an outer periphery of the membrane electrode assembly, the bonding dies being adapted to thermally compress a pair of separators that are arranged on opposite faces of the electrode assembly, thereby bonding the pair of separators to the resin frame.

The bonding dies include a first die and a second die, the first die being adapted to face and contact one of the separators, and the second die being adapted to face and contact the other separator. The first die includes a central receiving portion and an outer periphery receiving portion, the central receiving portion being adapted to receive a central region of the one separator that faces and contacts the electrode assembly, and the outer periphery receiving portion being adapted to receive a to-be-welded region of the one separator to be welded to the resin frame.

The second die includes an inner die and an outer die formed so as to surround the inner die, the inner die being adapted to pressurize a central region of the other separator that faces and contacts the electrode assembly, and the outer die being adapted to thermally compress a to-be-welded region of the other separator to be welded to the resin frame. The inner die extends from a portion corresponding to the central region of the other separator along an open edge formed in the resin frame, up to a region closer to the outer periphery side of the electrode assembly than to the bonded portion of the resin frame bonded to the membrane electrode assembly, so as to pressurize the resin frame via the other separator.

According to the bonding dies for producing a fuel cell of the present disclosure configured as above, first, the one separator, the membrane electrode assembly having gas diffusion layers stacked on its opposite faces, and the other separator are stacked in this order on the first die. At this time, the one separator is arranged such that the central region of the one separator is received by the central receiving portion of the first die, and the to-be-welded region of the one separator to be welded to the resin frame is received by the outer periphery receiving portion of the first die.

Next, the central region of the other separator is pressurized (and heated as appropriate) by the inner die of the second die, and then, the to-be-welded region of the other separator is thermally compressed by the outer die of the second die so that the pair of separators are welded to the membrane electrode assembly with the melted resin of the resin frame. At this time, even when the to-be-welded region of the other separator is pressurized by the outer die of the second die, a portion of the resin frame on the outer side of the bonded portion thereof as well as the electrode assembly is pressed by the inner die of the second die. Therefore, a moment acting on the resin frame relative to the membrane electrode assembly can be reduced. Consequently, the bonded portion of the resin frame bonded to the membrane electrode assembly can be prevented from peeling off the membrane electrode assembly.

According to the aforementioned embodiment, the other separator is not particularly limited, but a gasket may be arranged on a region on the outer periphery side of the other separator, and the outer die may be formed so as to thermally compress the to-be-welded region of the other separator that surrounds the outer periphery side of the gasket, while the inner die may be formed so as to press the region on the outer periphery side of the other separator via the gasket.

According to such an embodiment, the outer die does not contact the gasket arranged on the other separator. Therefore, the gasket is not heated excessively and alteration of the material of the gasket can be suppressed after a fuel cell stack is the assembled. Thus, the inherent function (i.e., a sealing property provided by elastic deformation) does not degrade.

Further, when the gasket is provided, the welding width of the to-be-welded region that surrounds the outer periphery of the gasket becomes narrow so that a moment becomes likely to act on the resin frame relative to the membrane electrode assembly. However, even in such a case, a portion (e.g., a portion where the gasket is arranged) of the resin frame on the outer side of the bonded portion thereof as well as the membrane electrode assembly can be pressed by the inner die of the second die. Thus, a moment acting on the resin frame relative to the membrane electrode assembly can be reduced.

According to the bonding dies for producing a fuel cell of the present disclosure, it is possible to, when bonding a pair of separators to opposite faces of an electrode assembly, which includes a membrane electrode assembly and a resin frame securely bonded thereto, suppress floating of the portion of the resin frame bonded to the membrane electrode assembly. This can prevent cross leakage across the produced fuel cells, thus stabilizing the quality of the resulting fuel cell stack.

DETAILED DESCRIPTION

Hereinafter, an embodiment of the bonding dies for producing a fuel cell in accordance with the present disclosure will be described in detail with reference to the drawings.

1. Regarding Fuel Cell 1

Figure 1:
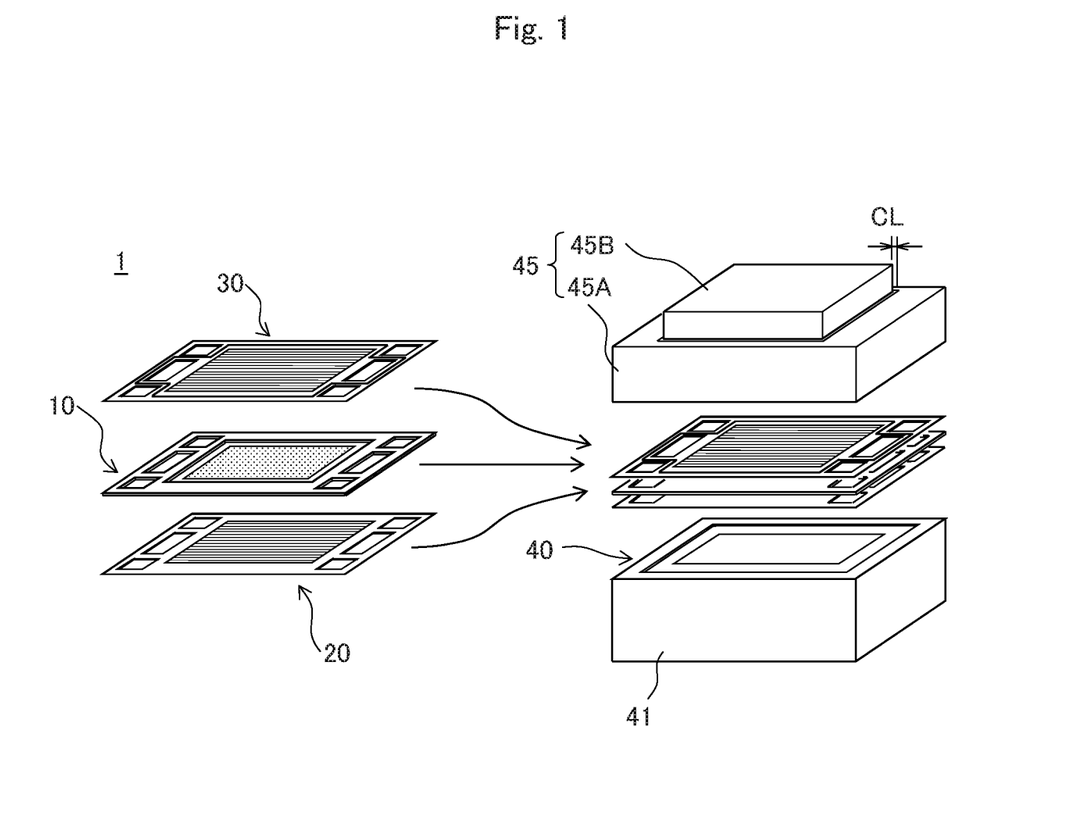
FIG. 1 is a perspective view of a primary portion illustrating a function of an embodiment of bonding dies for producing a fuel cell in accordance with the present disclosure.

First, a fuel cell 1 will be described with reference to FIGS. 1 to 5. As illustrated in FIG. 1, the fuel cell 1 includes an electrode assembly 10 and a pair of separators 20 and 30 that are bonded to opposite faces of the electrode assembly 10 so as to sandwich it. The bonding dies 40 for bonding these components together include a first die 41 adapted to face and contact the one separator 20 and a second die 45 adapted to face and contact the other separator 30.

First, the electrode assembly 10 of the fuel cell 1 will be described with reference to FIGS. 2A and 2B. The electrode assembly 10 includes a membrane electrode assembly 11 having gas diffusion layers 13a and 13b formed on its opposite faces, and a resin frame 15 fixed on the membrane electrode assembly 11 via a bonded portion 15a so as to surround the outer periphery of the membrane electrode assembly 11.

Figure 2A:
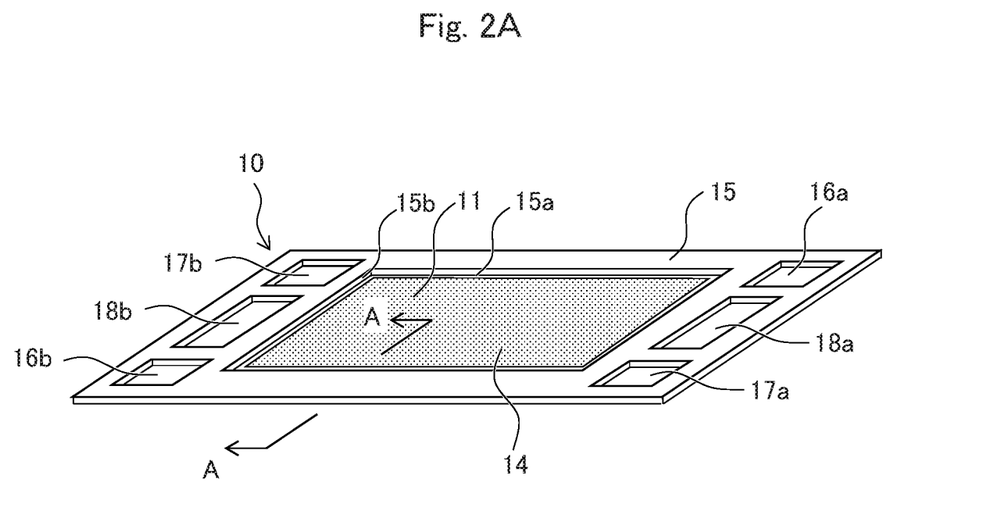
FIG. 2A is a schematic perspective view of an electrode assembly that forms the fuel cell illustrated in FIG. 1.

As illustrated in FIG. 2A, the membrane electrode assembly 11 is rectangular in shape, and includes a solid polymer electrolyte membrane and anode and cathode electrodes bonded to its opposite faces. Further, the membrane electrode assembly 11 has gas diffusion layers 13a and 13b stacked on its opposite faces. The central portion of the membrane electrode assembly 11 is rectangular in shape, and the gas diffusion layers 13a and 13b are formed on opposite faces of the central portion, thus forming an electricity-generating region 14.

The resin frame 15 is made of thermoplastic resin, and has an opening formed in its center so as to surround the outer periphery of the membrane electrode assembly 11. The resin frame 15 is fixed on one of the faces of the membrane electrode assembly 11 via the bonded portion 15a containing thermosetting resin. Since the bonded portion 15a is a portion formed of an adhesive, the bonded portion 15a spreads out toward the inner periphery side along an open edge 15b of the resin frame 15.

The resin frame 15 has openings 16a and 16b that form fuel gas flow channels, openings 17a and 17b that form oxidant gas flow channels, and openings 18a and 18b that form refrigerant flow channels, each formed on the outer periphery side of the central opening. In this embodiment, the opening 16a on one side is a fuel gas inlet, and the opening 16b on the other side is a fuel gas outlet. Meanwhile the opening 17a on one side is an oxidant gas inlet, and the opening 17b on the other side is an oxidant gas outlet. Further, the middle opening 18a on one side is a refrigerant (e.g., cooling water) inlet, and the middle opening 18b on the other side is a refrigerant outlet. The flow channels for fuel gas, oxidant gas, and refrigerant are separated by sealants (not illustrated) and the like that are formed between the electrode assembly 10 and the pair of separator 20 and 30.

The pair of separators 20 and 30 bonded to the opposite faces of the electrode assembly 10 will be described with reference to FIGS. 3A to 4B. The separators 20 and 30 basically have the same configuration and include an anode separator and a cathode separator.

Each of the separators 20 and 30 is a member formed from a thin, rectangular, metal plate, and serves to separate the membrane electrode assemblies 11 of the adjacent stacked fuel cells 1, and collect electricity generated from the membrane electrode assemblies 11. Each of the separators 20 and 30 is made of metal, such as titanium, titanium alloy, or stainless steel.

Each of the separators 20 and 30 has a plurality of grooves formed along the longitudinal direction on opposite faces of the central region thereof corresponding to the electricity-generating region 14 located in the center of the membrane electrode assembly 11 of the electrode assembly 10. Fuel gas, such as hydrogen gas, and oxidant gas, such as atmosphere, flow through the grooves of the separator facing the membrane electrode assembly 11, and refrigerant flows through the grooves of the separator facing an adjacent separator after the separators are stacked. Accordingly, fuel gas is supplied from one side of the membrane electrode assembly 11, and oxidant gas is supplied from the other side thereof so that the membrane electrode assembly 11 generates electricity.

Figure 3A:
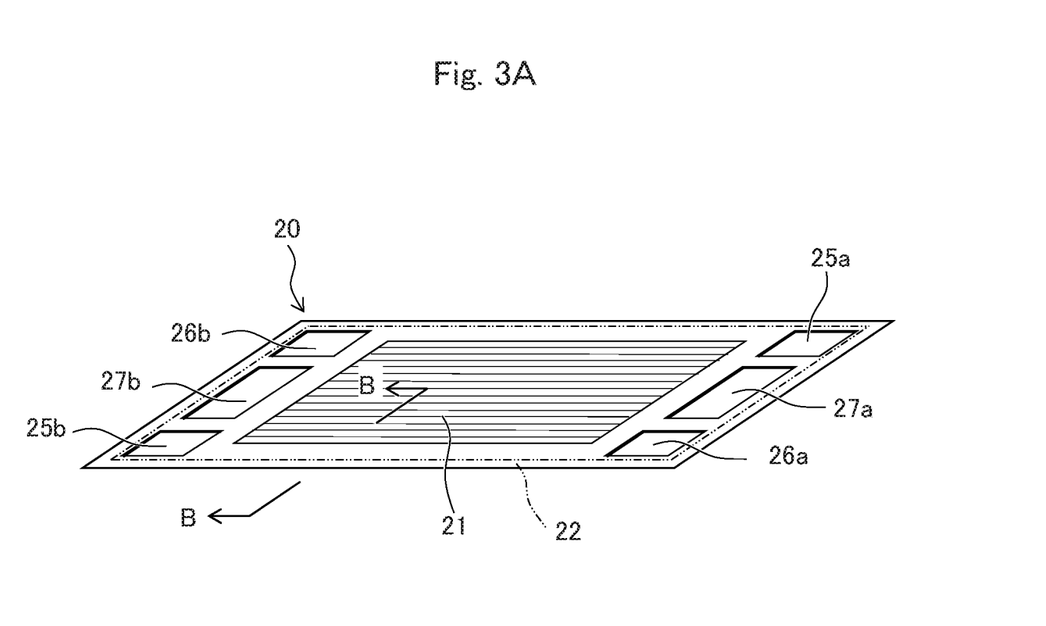
FIG. 3A is a schematic perspective view of one of separators of the fuel cell illustrated in FIG. 1.

As illustrated in FIG. 3A, the one separator 20 has three openings formed on each of its opposite sides in the longitudinal direction. Such openings are formed in the same shape as and at corresponding positions to the openings formed on the opposite sides of the electrode assembly 10 in the longitudinal direction. Specifically, an opening 25a on one side is a fuel gas inlet, and an opening 25b on the other side is a fuel gas outlet. In addition, an opening 26a on one side is an oxidant gas inlet, and an opening 26b on the other side is an oxidant gas outlet. Further, an opening 27a on one side is a refrigerant inlet, and an opening 27b on the other side is a refrigerant outlet.

Figure 3B:
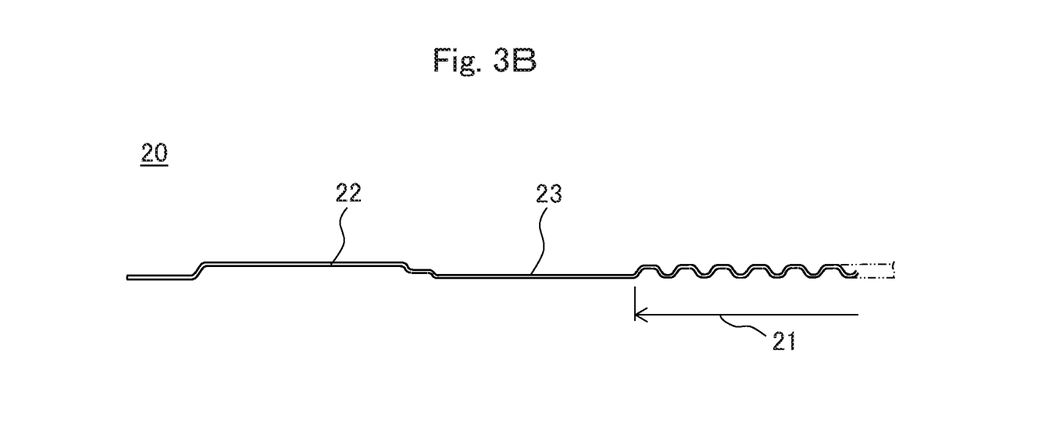
FIG. 3B is a cross-sectional view of the primary portion along line B-B of FIG. 3A.
Figure 5:
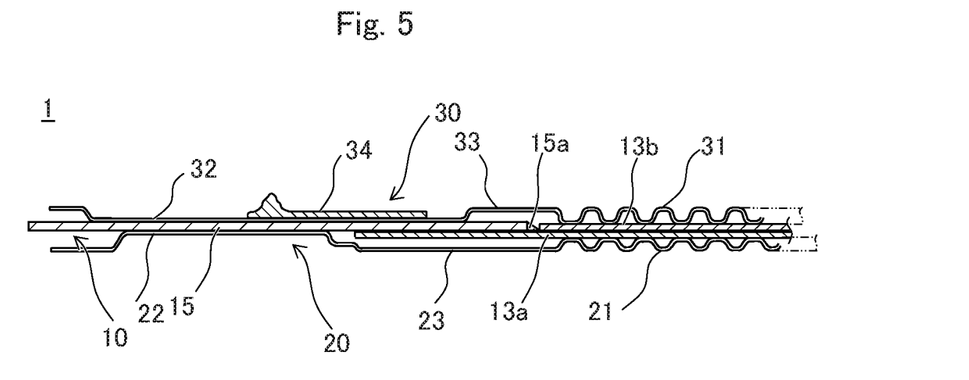
FIG. 5 is a cross-sectional view of the primary portion of a fuel cell obtained by bonding one separator illustrated in FIG. 3B and the other separator illustrated in FIG. 4B to the electrode assembly illustrated in FIG. 2B.

The one separator 20 has a to-be-welded region 22 formed on the outer periphery side thereof so as to surround the central region 21, and resin of the resin frame 15 is welded to the to-be-welded region 22. In this embodiment, as illustrated in FIG. 3B, a step region 23 is formed between the central region 21 and the to-be-welded region 22. As illustrated in FIG. 5, the step region 23 is recessed on a side facing the electrode assembly 10, and the electrode assembly 10 (specifically, a portion of the gas diffusion layer 13a bonded to the bonded portion 15a) is thus not in contact with the step region 23.

Figure 4A:
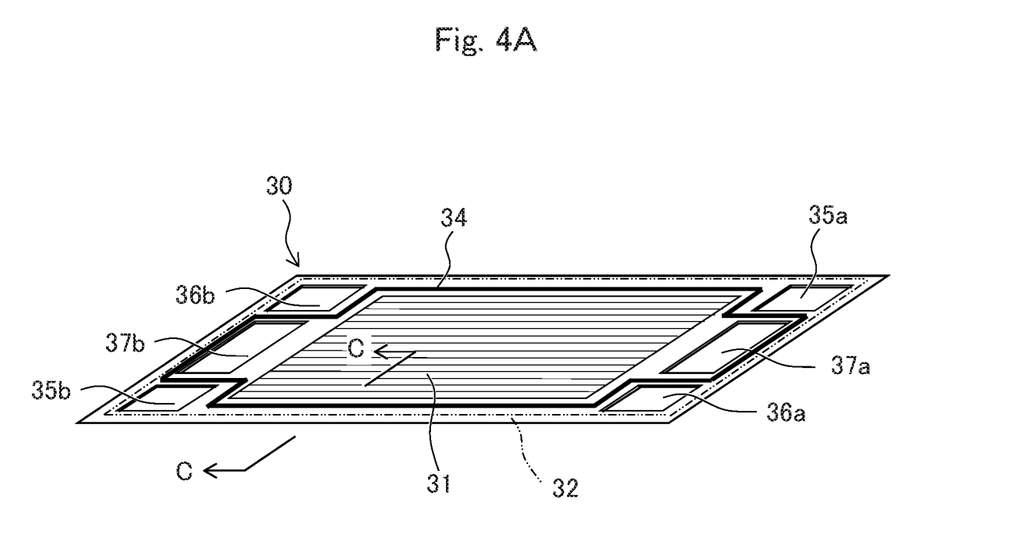
FIG. 4A is a schematic perspective view of the other separator of the fuel cell illustrated in FIG. 1.

As illustrated in FIG. 4A, the other separator 30 has three openings formed on each of its opposite sides in the longitudinal direction. Such openings are formed in the same shape as and at corresponding positions to the openings formed on the opposite sides of the electrode assembly 10 as well as the one separator 20 in the longitudinal direction. Specifically, an opening 35a on one side is a fuel gas inlet, and an opening 35b on the other side is a fuel gas outlet. In addition, an opening 36a on one side is an oxidant gas inlet, and an opening 36b on the other side is an oxidant gas outlet. Further, an opening 37a on one side is a refrigerant inlet, and an opening 37b on the other side is a refrigerant outlet.

Figure 4B:
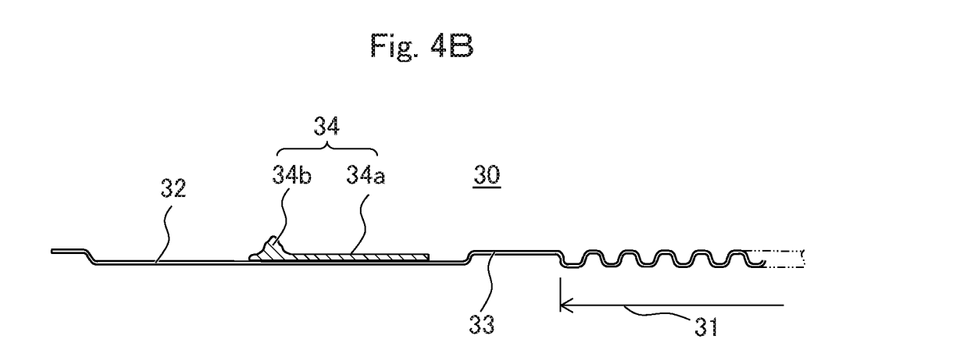
FIG. 4B is a cross-sectional view of the primary portion along line C-C of FIG. 4A.

The upper separator 30 includes a to-be-welded region 32 formed on the outer periphery side thereof so as to surround the central region 31, and resin of the resin frame 15 is welded to the to-be-welded region 32. In this embodiment, as illustrated in FIG. 4B, a step region 33 is formed between the central region 31 and the to-be-welded region 32. As illustrated in FIG. 5, the step region 33 is recessed on a side facing the electrode assembly 10, and the electrode assembly 10 (specifically, the bonded portion 15a) is thus not in contact with the step region 33. The upper separator 30 contacts the electrode assembly 10 on the outer periphery side of the step region 33 and on the inner periphery side of the to-be-welded region 32 of the separator 30, specifically, in a region where a gasket 34 described below is arranged.

The other separator 30 has the gasket 34 on its face opposite to the face facing the electrode assembly 10, that is, on the outer surface of the fuel cell 1. The gasket 34 is arranged such that it surrounds the central region 31 and the openings 37a and 37b on the inner side of the to-be-welded region 32. The gasket 34 has a flat portion 34a and a protrusion 34b formed on the outer periphery side thereof in a protruding manner. The gasket 34 can, when a number of fuel cells 1 are securely stacked to form a fuel cell stack (not illustrated), secure sealing between the separator 30 and the adjacent separator 20 with the protrusion 34b being pressed and deformed. Accordingly, refrigerant is allowed to flow through a space between the separator 20 and the separator 30 sealed by the gasket 34.

Figure 2B:
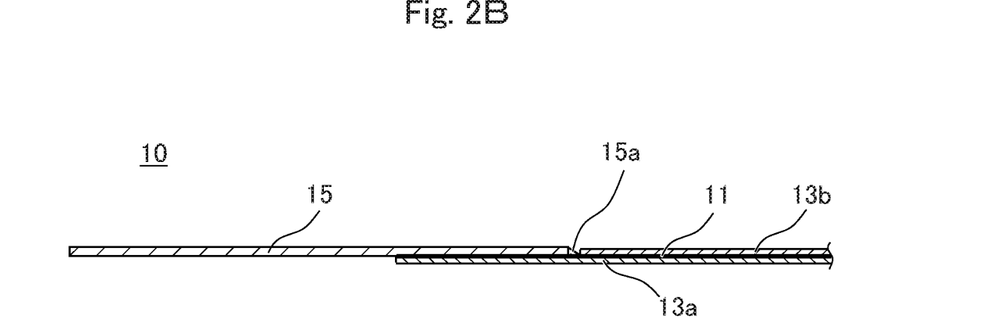
FIG. 2B is a cross-sectional view of the primary portion along line A-A of FIG. 2A.

The aforementioned electrode assembly 10 obtained by fixing the resin frame 15 to the membrane electrode assembly 11 illustrated in FIG. 2B, and the fuel cell 1 obtained by fixing the pair of separators 20 and 30 to the opposite faces of the electrode assembly 10 are configured as illustrated in FIG. 5. That is, the gas diffusion layer 13a faces and contacts the central region 21 of the separator 20, and the resin frame 15 faces and contacts the to-be-welded region 22, and further, the step region 23 is spaced apart from the portion of the gas diffusion layer 13a bonded to the bonded portion 15a. Meanwhile, the gas diffusion layer 13b faces and contacts the central region 31 of the separator 30, and an upper face of the resin frame 15 faces and contacts the to-be-welded region 32, and further, the step region 33 is spaced apart from the bonded portion 15a.

2. Regarding the Bonding Dies 40

Next, the bonding dies 40 for producing the fuel cell 1 configured as above will be described with reference to FIGS. 6A and 6B. The bonding dies 40 of this embodiment are dies for producing the fuel cell 1 by bonding the separators 20 and 30 to the opposite faces of the electrode assembly 10. Specifically, the bonding dies 40 include the first die 41 adapted to face and contact a lower portion of the separator 20 of the fuel cell 1, and the second die 45 adapted to face and contact an upper portion of the separator 30 of the fuel cell 1. The lower first die 41 is formed as a single die and is disposed on a base. The upper second die 45 includes two components that are an outer die 45A and an inner die 45B.

The first die 41 includes a central receiving portion 41a adapted to receive the central region 21 of the one separator 20 facing and contacting the electrode assembly 10, and an outer periphery receiving portion 41b formed so as to surround the central receiving portion 41a and adapted to receive the to-be-welded region 22 of the lower separator 20 welded to the resin frame 15.

Specifically, the central receiving portion 41a is formed such that it supports the central region 21 of the separator 20 that has formed therein grooves forming flow channels for circulating fuel gas or oxidant gas, while the outer periphery receiving portion 41b is formed such that it receives the to-be-welded region 22 on the outer periphery. A depressed portion 41c is further formed between the central receiving portion 41a and the outer periphery receiving portion 41b along the outer periphery of the central receiving portion 41a.

The first die 41 incorporates a heating unit 43 for bonding the electrode assembly 10 and the separator 20 together. The heating unit 43 may be any of a steam or conducting type as long as it can heat the first die 41. The heating temperature of the heating unit 43 is set so as to heat the separator 20 up to a temperature that can melt resin of the resin frame 15 of the electrode assembly 10 via the separator 20.

The second die 45 includes the inner die 45B adapted to pressurize the central region 31 of the separator 30 facing and contacting the electrode assembly 10, and the outer die 45A formed so as to surround the inner die 45B and adapted to thermally compress the to-be-welded region 32 of the separator 30 to be welded to the resin frame 15 of the electrode assembly 10. The outer die 45A includes an outer periphery pressing portion 45d adapted to face and contact the to-be-welded region 32 of the separator 30. Thus, the to-be-welded region 32 of the separator 30 is thermally compressed by the outer periphery pressing portion 45d.

The inner die 45B includes a central pressing portion 45c adapted to face and contact the central region 31 of the separator 30 and thus pressurize the central region 31. The central pressing portion 45c has formed therein an extending portion 45e that extends from a portion corresponding to the central region 31 of the separator 30 along an open edge formed in the resin frame 15, up to a region closer to the outer periphery side of the electrode assembly 10 than to the bonded portion 15a of the resin frame 15 bonded to the membrane electrode assembly 11, so as to pressurize the resin frame 15 via the separator 30.

A clearance CL is formed on the outer periphery of the inner die 45B so that each of the inner die 45B located in the center of the second die 45 and the outer die 45A located on the outer periphery of the inner die 45B can move independently. Each of the inner die 45B and the outer die 45A is movable in the vertical direction by means of an actuator (not illustrated) and is configured to adjust the pressure to be applied for producing the fuel cell 1. In the bonding dies 40 of this embodiment, the pressure of the inner die 45B for correcting warps is set higher than that of the outer die 45A for thermally compressing the separator 30.

The outer die 45A of the second die 45 incorporates a heating unit 47 adapted to heat the electrode assembly 10 and the separator 30. The heating unit 47 may be any of a steam or conducting type as long as it can heat the second die 45 (or the outer die 45A thereof). The heating temperature of the heating unit 47 is set so that it can heat the outer periphery pressing portion 45d and heat the separator 30 up to a temperature that can melt resin of the resin frame 15 of the electrode assembly 10.

The bottom face of the first die 41, which is placed on a base or the like, is formed flat. The contact surface of the first die 41, which is adapted to contact the separator 20, is the surface of the outer periphery receiving portion 41b that protrudes so as to face and contact the to-be-welded region 22 of the separator 20, and the surface of the central receiving portion 41a adapted to face and contact the central region 21. The surface of the depressed portion 41c, which is formed between the central receiving portion 41a and the outer periphery receiving portion 41b, is spaced apart from the step region 23 of the separator 20 and thus does not contact the step region 23.

The surface of the second die 45, which is adapted to pressurize or thermally compress the separator 30, is the surface of the outer periphery pressing portion 45d of the outer die 45A and the surface of the central pressing portion 45c of the inner die 45B. The width of the outer periphery pressing portion 45d is about several mm (i.e., 1 to 3 mm). A depressed portion 45f, which is recessed upward, is formed between the outer periphery pressing portion 45d and the central pressing portion 45c. With a space formed by the depressed portion 45f, the gasket 34 can be prevented from contacting the outer die 45A during bonding, and heat to be transferred to the separator 30 from the outer periphery pressing portion 45d can be radiated in the space formed by the depressed portion 45f.

3. Regarding a Bonding Method Using the Bonding Dies 40

Hereinafter, a bonding method using the bonding dies 40 will be described. The one separator 20 is placed on the first die 41 that is disposed on a base or the like. The central region 21 of the separator 20 is supported by the central receiving portion 41a, and the to-be-welded region 22, which is formed so as to surround the central receiving portion 41a, is supported by the outer periphery receiving portion 41b. It should be noted that the surface of the depressed portion 41c, which is formed by a step between the central receiving portion 41a and the outer periphery receiving portion 41b, is spaced apart from the separator 20.

Next, the electrode assembly 10 is disposed on the separator 20 placed on the first die 41. The resin frame 15, which is fixed on the electrode assembly 10 via the bonded portion 15a, faces and contacts the to-be-welded region 22 of the separator 20, and is supported by the outer periphery receiving portion 41b of the first die 41. The gas diffusion layer 13a of the membrane electrode assembly 11 faces and contacts the central region 21 of the separator 20 and is supported by the central receiving portion 41a. The surface of the depressed portion 41c is spaced apart from the gas diffusion layer 13a.

After that, the separator 30 is placed on the electrode assembly 10. The central region 31 of the separator 30 faces and contacts the gas diffusion layer 13b formed on the membrane electrode assembly 11 of the electrode assembly 10, and the to-be-welded region 32 of the separator 30 faces and contacts the resin frame 15.

Next, the inner die 45B of the second die 45 is lowered by its actuator so that the central pressing portion 45c of the inner die 45B presses the central region 31 of the separator 30. Next, the outer die 45A is lowered by its actuator while the central region 31 of the separator 30 is pressed, so that the outer die 45A strongly presses the to-be-welded region 32 of the separator 30 while contacting it.

The first die 41 is heated in its outer periphery receiving portion 41b, and the second die 45 is heated in its outer die 45A. Therefore, while warps and the like of the central regions 21 and 31 of the separators 20 and 30 are corrected, resin of the resin frame 15 melts in the to-be-welded regions 22 and 32 on the outer periphery so that the to-be-welded regions 22 and 32 of the separators 20 and 30 are bonded to the resin frame 15 of the electrode assembly 10.

During the bonding process using the bonding dies 40, first, the separator 20, the electrode assembly 10, and the separator 30 are sandwiched between the central receiving portion 41a and the central pressing portion 45c of the inner die 45B. After that, the outer die 45A is lowered to heat the to-be-welded regions 22 and 32 and thus perform bonding. Therefore, position displacement of the separator 20, the electrode assembly 10, and the separator 30 can be prevented, thus enabling high precision bonding.

As described above, the resin frame 15 of the electrode assembly 10 is sandwiched between the to-be-welded region 22 of the separator 20 and the to-be-welded region 32 of the separator 30 so as to be thermally compressed and welded thereto, using the outer periphery receiving portion 41b of the first die 41 and the outer periphery pressing portion 45d of the outer die 45A of the second die 45. During the thermal compression bonding, a moment M in a counterclockwise direction illustrated in FIG. 6B acts on the resin frame 15. Specifically, the moment M acts in the direction in which the bonded portion 15a of the resin frame 15 bonded to the membrane electrode assembly 11 would be peeled off the membrane electrode assembly 11. In particular, when the gasket 34 is provided on the outer periphery of the central region 31 of the separator 30, the welding width of the to-be-welded region 32 that surrounds the outer periphery of the gasket 34 is difficult to secure. Therefore, the welding width becomes narrow and the moment M is likely to occur.

However, since the inner die 45B of the second die 45 is provided with the extending portion 45e that extends to a region closer to the outer periphery side of the electrode assembly 10 than to the bonded portion 15a, the extending portion 45e can press a portion of the resin frame 15 on the outer side of the bonded portion 15a thereof as well as the electrode assembly 10. This can reduce a moment acting on the resin frame 15 relative to the membrane electrode assembly 11 and thus prevent the resin frame 15 from floating off the membrane electrode assembly 11. Consequently, the bonded portion 15a of the resin frame 15 bonded to the membrane electrode assembly 11 can be prevented from peeling off the membrane electrode assembly 11.

When the clearance CL is provided between the outer die 45A and the inner die 45B, heat of the outer die 45A is difficult to be transferred to the inner die 45B. Therefore, the membrane electrode assembly 11 can be prevented from being heated to a high temperature.

Next, another embodiment of the bonding dies in accordance with the present disclosure will be described with reference to FIGS. 7A and 7B. The bonding dies of this embodiment differ from those illustrated in FIGS. 6A and 6B in the inner die of the second die 45. Therefore, configurations that are substantially the same are denoted by the same reference numerals, and the detailed description thereof will be omitted.

Figure 6A:
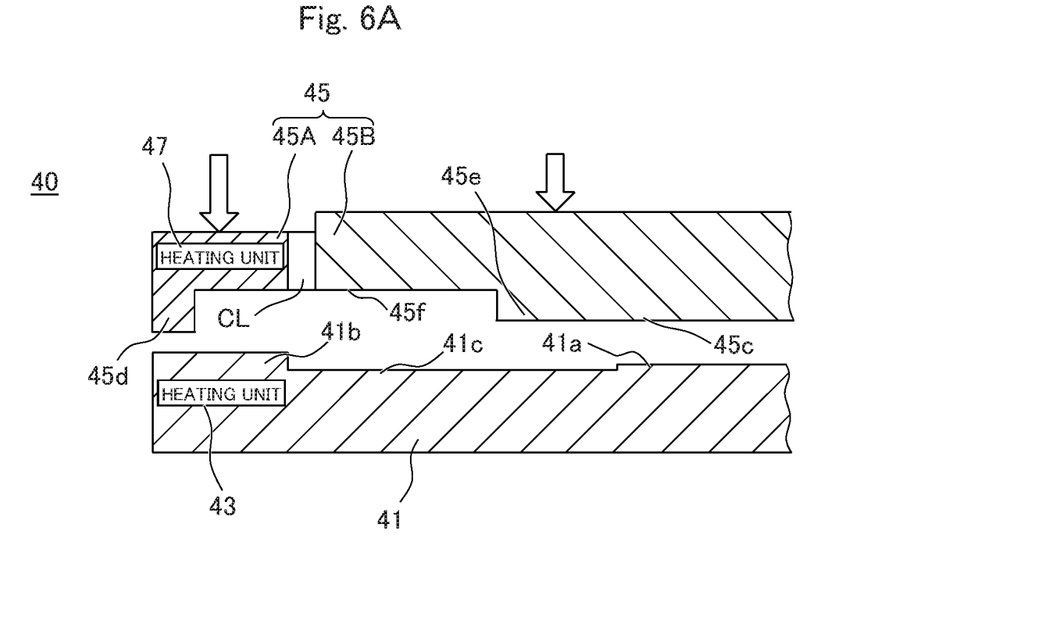
FIG. 6A is a cross-sectional view of the primary portion of bonding dies for producing the fuel cell illustrated in FIG. 5.
Figure 6B:
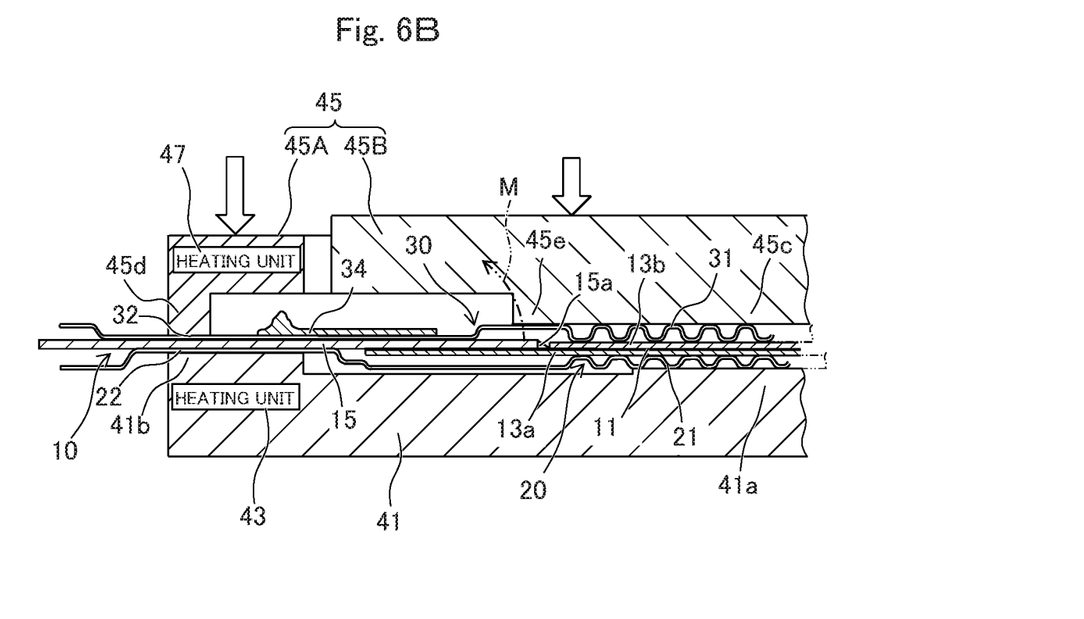
FIG. 6B is a cross-sectional view of the primary portion illustrating a state in which separators are bonded to opposite faces of an electrode assembly by the bonding dies illustrated in FIG. 6A to produce the fuel cell illustrated in FIG. 5.
Figure 7A:
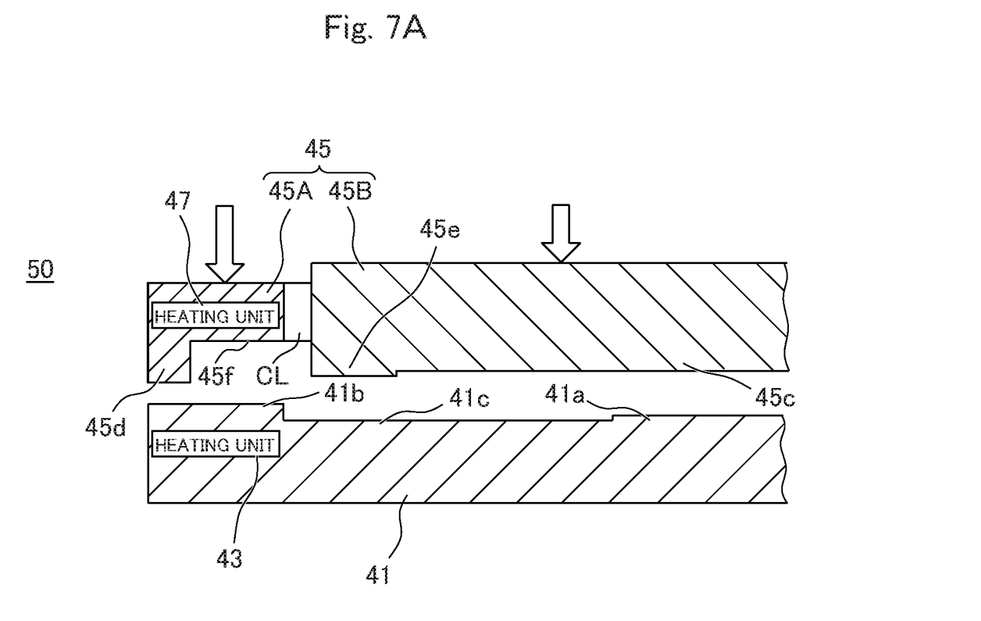
FIG. 7A is a cross-sectional view of the primary portion of another embodiment of bonding dies for producing the fuel cell illustrated in FIG. 5.
Figure 7B:
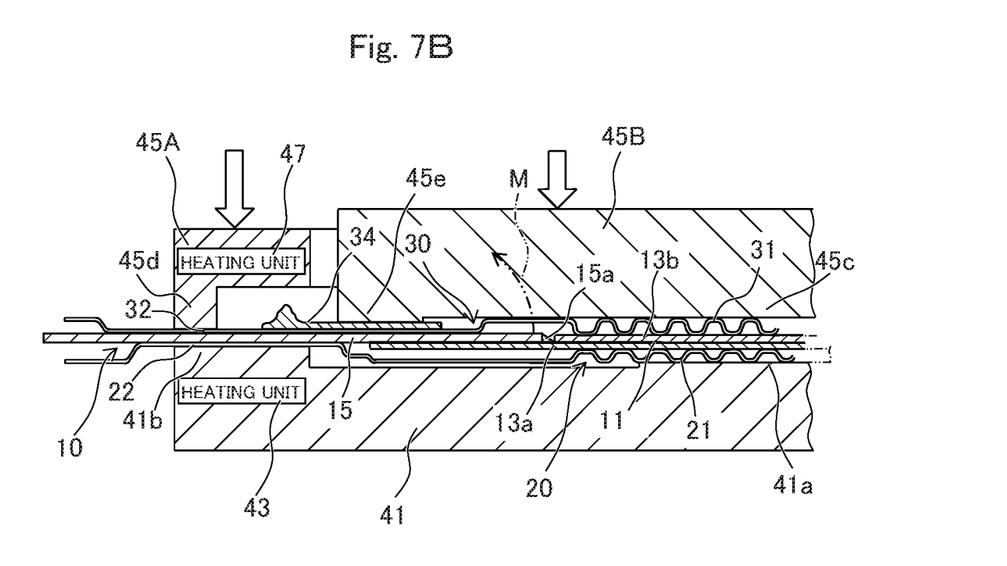
FIG. 7B is a cross-sectional view of the primary portion illustrating a state in which separators are bonded to opposite faces of an electrode assembly by the bonding dies illustrated in FIG. 7A to produce the fuel cell illustrated in FIG. 5.

As illustrated in FIGS. 7A and 7B, the outer die 45A is formed such that it thermally compresses the to-be-welded region 32 that surrounds the outer periphery side of the gasket 34, and the outer die 45A has the same structure as the outer die illustrated in FIGS. 6A and 6B. Meanwhile, the inner die 45B is formed such that it presses a region on the outer periphery side of the separator 30 via the gasket 34, up to a region closer to the outer periphery side of the electrode assembly 10 than to the bonded portion 15a.

Specifically, the extending portion 45e of the inner die 45B extends up to the gasket 34 arranged in a region on the outer periphery side of the electrode assembly 10, further away from the bonded portion 15a of the resin frame 15 bonded to the membrane electrode assembly 11, along an open edge of the resin frame 15. Accordingly, the gasket 34 is pressed by the extending portion 45e during bonding, as illustrated in FIG. 7B.

In this embodiment, when the pair of separators 20 and 30 are bonded to the opposite faces of the electrode assembly 10, the gasket 34 at a position closer to the position where the separator 30 is pressed by the outer die 45A is pressed by the extending portion 45e of the inner die 45B. Therefore, during the process of thermal compression bonding using the outer die 45A, a moment M becomes further difficult to act on the resin frame 15 bonded to the membrane electrode assembly 11.

Further, since the gasket 34 is pressed not by the outer die 45A but by the inner die 45B, the gasket 34 is not heated excessively. Therefore, when a number of fuel cells 1, each obtained by bonding the separators 20 and 30 to the electrode assembly 10, are stacked to assemble a fuel cell stack, the quality of the gasket 34 can be maintained and the sealing property of the gasket 34 does not degrade.

Next, another embodiment of the bonding dies in accordance with the present disclosure will be described with reference to FIGS. 8A and 8B. The bonding dies of this embodiment differ from those illustrated in FIGS. 6A and 6B in the first die 41 and the inner die of the second die 45, and that portions of the dies that contact the separators 20 and 30 are each formed of a heat insulating material. Therefore, configurations that are substantially the same are denoted by the same reference numerals, and the detailed description thereof will be omitted.

Figure 8A:
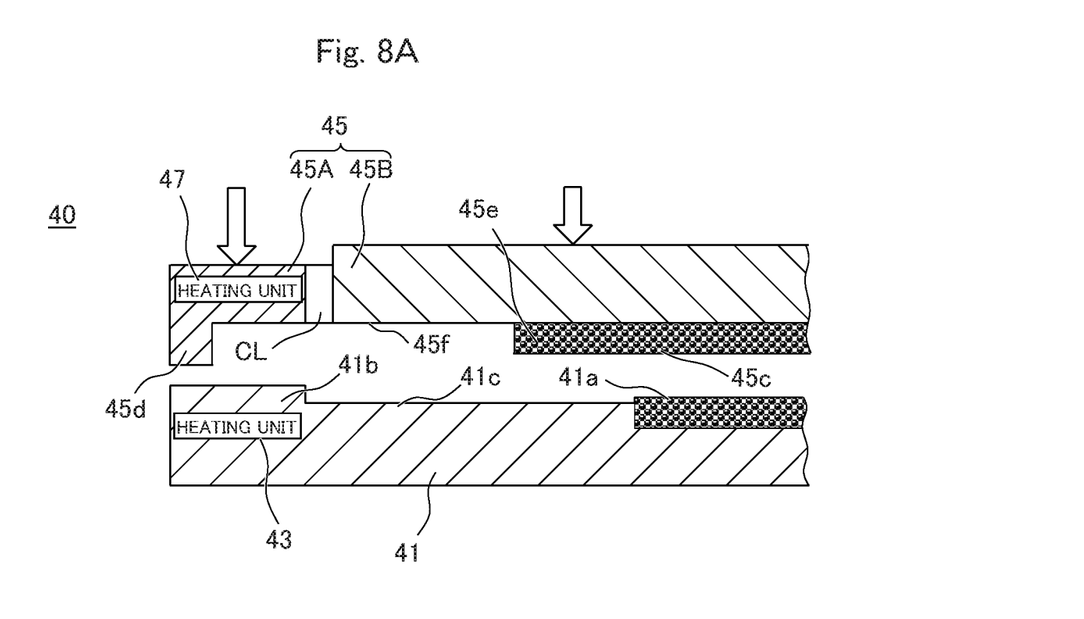
FIG. 8A is a cross-sectional view of the primary portion of another embodiment of bonding dies for producing the fuel cell illustrated in FIG. 5.
Figure 8B:
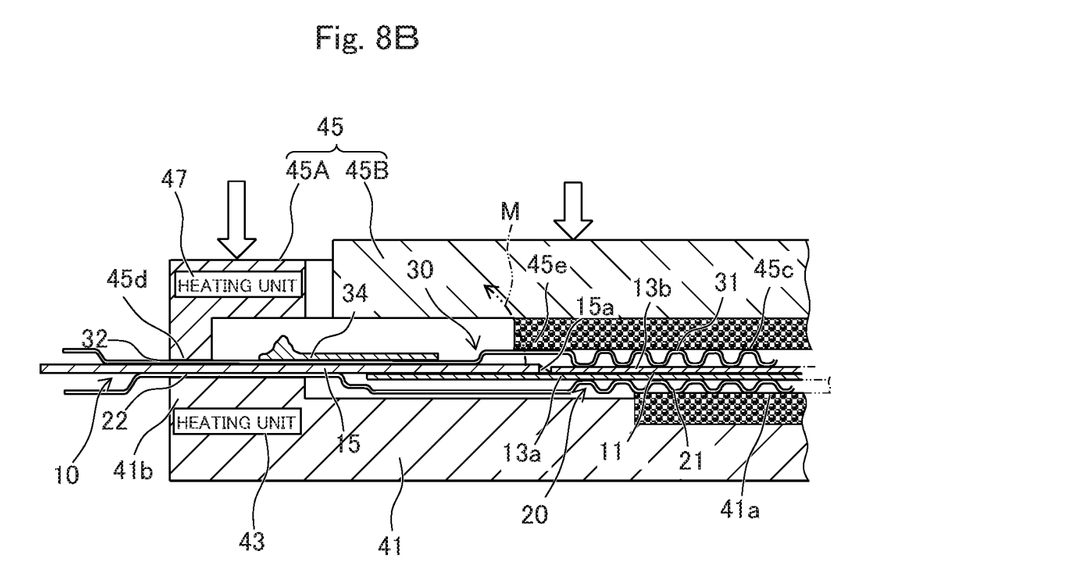
FIG. 8B is a cross-sectional view of the primary portion of a state in which separators are bonded to opposite faces of an electrode assembly by the bonding dies illustrated in FIG. 8A to produce the fuel cell illustrated in FIG. 5.

As illustrated in FIGS. 8A and 8B, the first die 41 has the same shape as the first die 41 illustrated in FIGS. 6A and 6B, but differs in the following point. Specifically, the central receiving portion 41a, which is adapted to face and contact the central region 21 of the separator 20, of the first die 41 is made of a heat insulating material. The heat insulating material has lower thermal conductivity than metal forming the body of the first die 41. Examples of the heat insulating material include porous ceramic.

The second die 45 has the same shape as the second die 45 illustrated in FIGS. 6A and 6B, but the central pressing portion 45c, which is adapted to face and contact the central region 31 of the separator 30, of the inner die 45B, and the extending portion 45e continuously extending from the central pressing portion 45c are each made of a heat insulating material. The heat insulating material has lower thermal conductivity than metal forming the body of the inner die 45B. Examples of the heat insulating material include porous ceramic.

According to this embodiment, the central receiving portion 41a of the first die 41 as well as the central pressing portion 45c and the extending portion 45e of the second die 45 are each made of a heat insulating material. This can suppress transfer of heat from the heating unit 43 of the first die 41 and heat from the heating unit 47 of the second die 45 to the membrane electrode assembly 11 of the electrode assembly 10 via the separators 20 and 30. Accordingly, a decrease in the electricity generation performance of the fuel cell 1 can be suppressed.

In this embodiment, each of the central pressing portion 45c and the extending portion 45e of the second die 45 is made of a heat insulating material, but only the extending portion 45e may be made of a heat insulating material, for example. This can suppress transfer of heat from the heating unit 47 of the second die 45 to the peripheral edge of the membrane electrode assembly 11. Accordingly, a decrease in the bonding strength of the bonded portion 15a due to heat can be suppressed.

Next, another embodiment of the bonding dies in accordance with the present disclosure will be described with reference to FIGS. 9A and 9B. The bonding dies of this embodiment differ from those illustrated in FIGS. 6A and 6B in the shapes of the first die 41 and the inner die of the second die 45. Therefore, configurations that are substantially the same are denoted by the same reference numerals, and the detailed description thereof will be omitted.

Figure 9A:
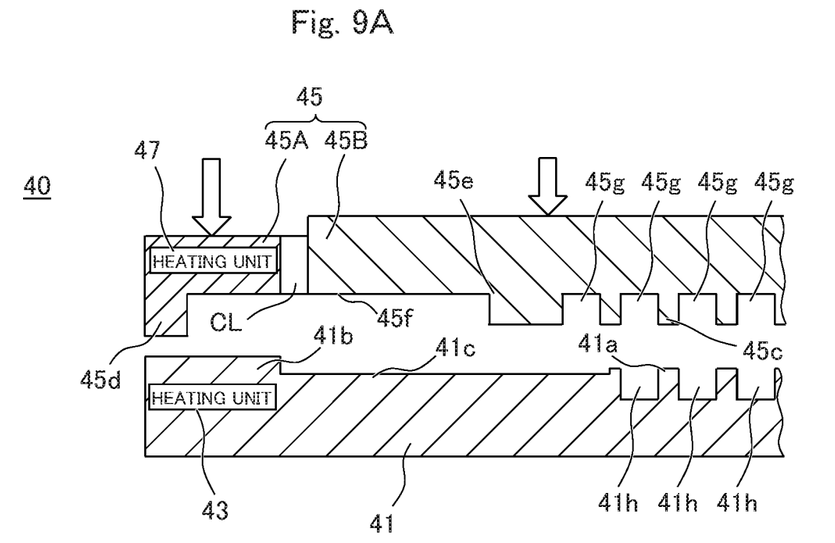
FIG. 9A is a cross-sectional view of the primary portion of another embodiment of bonding dies for illustrating the fuel cell illustrated in FIG. 5.
Figure 9B:
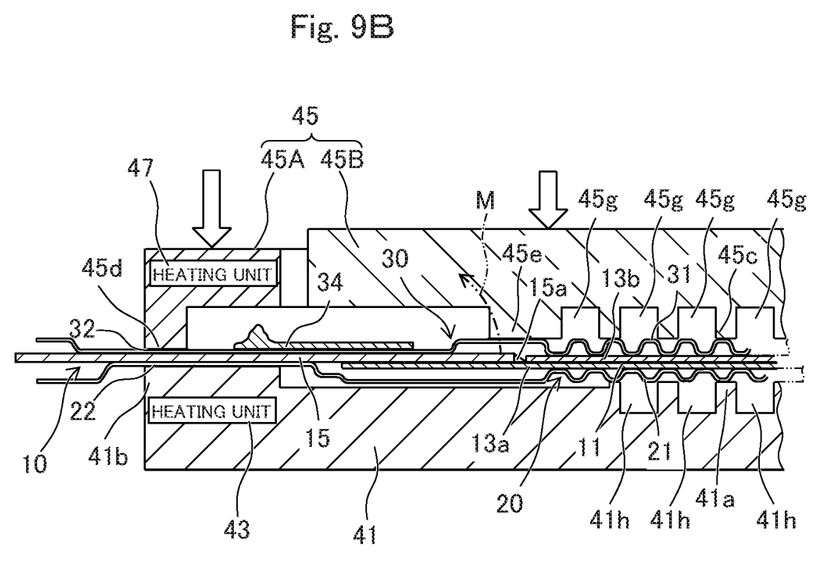
FIG. 9B is a cross-sectional view of the primary portion illustrating a state in which separators are bonded to opposite faces of an electrode assembly by the bonding dies illustrated in FIG. 9A to produce the fuel cell illustrated in FIG. 5.

As illustrated in FIGS. 9A and 9B, in this embodiment, the first die 41 has a different shape from the first die 41 illustrated in FIGS. 6A and 6B. Specifically, the central receiving portion 41a, which is adapted to face and contact the central region 21 of the separator 20, of the first die 41 has formed therein a plurality of recesses 41h, such as recessed grooves. In addition, the second die 45 has a different shape from the second die 45 illustrated in FIGS. 6A and 6B, and the central pressing portion 45*c*, which is adapted to face and contact the central region 31 of the separator 30, of the inner die 45B has formed therein a plurality of recesses 45*g*, such as recessed grooves.

According to this embodiment, the recesses 41*h* and 45*g* are provided in the central receiving portion 41*a* of the first die 41 and in the central pressing portion 45*c* of the second die 45, respectively, so that an area of contact between the separators 20 and 30 and the central receiving portion 41*a* of the first die 41 and the central pressing portion 45*c* of the second die 45 can be reduced. This can suppress transfer of heat from the heating unit 43 of the first die 41 and transfer of heat from the heating unit 47 of the second die 45 to the membrane electrode assembly 11 of the electrode assembly 10 via the separators 20 and 30. Consequently, a decrease in the electricity generation performance of the fuel cell 1 can be suppressed. If the extending portion 45*e* of the second die 45 is also provided with recesses, transfer of heat from the heating unit 47 of the second die 45 to the peripheral edge of the membrane electrode assembly 11 can be further suppressed. Accordingly, a decrease in the bonding strength of the bonded portion 15*a* due to heat can be suppressed.

Although the embodiment of the present disclosure has been described in detail, the present disclosure is not limited thereto, and various changes in design can be made without departing from the spirit and scope of the present disclosure recited in the claims.

DESCRIPTION OF SYMBOLS

1 Fuel cell
10 Electrode assembly
11 Membrane electrode assembly
13*a*, 13*b* Gas diffusion layer
15 Resin frame
15*a* Bonded portion
20, 30 Separator
21,31 Central region
22, 32 To-be-welded region
34 Gasket
40, 50 Bonding dies
41 First die
41*a* Central receiving portion
41*b* Outer periphery receiving portion
43, 47 Heating unit
45, 55 Second die
45A, 55A Outer die
45B, 55B Inner die
45*c* Central pressing portion
45*d* Outer periphery pressing portion
45*e* Extending portion

What is claimed is:

1. Bonding dies for producing a fuel cell, the fuel cell including an electrode assembly that includes a membrane electrode assembly having gas diffusion layers stacked on opposite faces of the membrane electrode assembly, and a resin frame fixed on the membrane electrode assembly via a bonded portion of the resin frame, so as to surround an outer periphery of the membrane electrode assembly, the bonding dies being adapted to thermally compress a pair of separators, including a first separator and a second separator, that are arranged on opposite faces of the electrode assembly, thereby bonding the pair of separators to the resin frame, the first separator and the second separator facing and contacting the electrode assembly, the bonding dies comprise: a first die and a second die, such that when the pair of separators are inserted between the bonding dies the first die faces and contacts the first separator, and the second die faces and contacts the second separator, wherein:

the first die includes a central receiving portion and an outer periphery receiving portion disposed outside of the central receiving portion, the central receiving portion receiving a central region of the first separator when the pair of separators are inserted between the bonding dies, and the outer periphery receiving portion receiving a peripheral region of the first separator when the pair of separators are inserted between the bonding dies, the peripheral region of the first separator being disposed on an outer periphery of the central region of the first separator, the second die includes an inner die and an outer die formed so as to surround the inner die, the inner die pressurizing a central region of the second separator when the pair of separators are inserted between the bonding dies, and the outer die thermally compressing a peripheral region of the second separator when the pair of separators are inserted between the bonding dies, the peripheral region of the second separator being disposed on an outer periphery of the central region of the second separator, the inner die of the second die extends from a portion corresponding to the central region of the second separator, along an open edge formed in the resin frame, up to a region closer to an outer periphery side of the electrode assembly than the bonded portion of the resin frame bonded to the membrane electrode assembly when the pair of separators are inserted between the bonding dies, so as to pressurize the resin frame via the second separator, there is a clearance formed between the inner die and the outer die of the second die, and each of the inner die and the outer die of the second die are independently movable in a direction toward the first die, with respect to each other.

2. The bonding dies according to claim 1, wherein:

a gasket is arranged on the peripheral region of the second separator, the outer die of the second die thermally compresses the peripheral region of the second separator, when the pair of separators are inserted between the bonding dies, and the inner die of the second die presses a region of the second separator on an outer periphery side thereof via the gasket when the pair of separators are inserted between the bonding dies.

3. The bonding dies according to claim 1, wherein the second die includes a heating unit.

* * * * *